US012775289B2

United States Patent
(12) United States Patent
Shang et al.

(10) Patent No.: US 12,775,289 B2
(45) Date of Patent: Oct. 27, 2026

(54) GATE LINKAGE CONTROL METHOD AND DEVICE AND PARALLEL WATER SUPPLY AND POWER GENERATION SYSTEM

(71) Applicants: CHINA THREE GORGES CORPORATION, Wuhan (CN); CHINA INSTITUTE OF WATER RESOURCES AND HYDROPOWER RESEARCH, Beijing (CN)

(72) Inventors: Yizi Shang, Beijing (CN); Lili Liang, Beijing (CN); Xiaofei Li, Beijing (CN); Jiaguo Gong, Beijing (CN); Yuntao Ye, Beijing (CN); Zhiwu Liu, Beijing (CN)

(73) Assignees: CHINA THREE GORGES CORPORATION (CN); CHINA INSTITUTE OF WATER RESOURCES AND HYDROPOWER RESEARCH (CN)

( * ) Notice: Subject to any disclaimer, the term of this patent is extended or adjusted under 35 U.S.C. 154(b) by 0 days.

(21) Appl. No.: 18/728,571

(22) PCT Filed: Jul. 10, 2023

(86) PCT No.: PCT/CN2023/106647
§ 371 (c)(1),
(2) Date: Jul. 12, 2024

(87) PCT Pub. No.: WO2024/109103
PCT Pub. Date: May 30, 2024

(65) Prior Publication Data
US 2025/0383673 A1 Dec. 18, 2025

(30) Foreign Application Priority Data
Mar. 2, 2023 (CN) ........................ 202310220346.1

(51) Int. Cl.
*G05D 7/06* (2006.01)

(52) U.S. Cl.
CPC ................................. *G05D 7/0623* (2013.01)

(58) Field of Classification Search
CPC ........... G05D 7/0623; E02B 7/20; E02B 9/02; E02B 9/00
See application file for complete search history.

(56) References Cited

U.S. PATENT DOCUMENTS

2002/0066484 A1* 6/2002 Stringam ................ E02B 13/02 137/392

FOREIGN PATENT DOCUMENTS

| | | | | |
|---|---|---|---|---|
| CN | 111945653 A | * 11/2020 | .............. | E02B 7/22 |
| CN | 213634215 U | * 7/2021 | | |
| TW | 201625834 A | * 7/2016 | | |

* cited by examiner

*Primary Examiner* — Vincent H Tran

(57) ABSTRACT

A gate linkage control method and device and a parallel water supply and power generation system are provided. The method comprises the following steps of: acquiring current gate opening degree information of the parallel water supply and power generation system and a current water level of a third trunk canal, the current gate opening degree information comprising current first gate opening degree information and current second gate opening degree information; determining a target gate linkage control strategy of the parallel water supply and power generation system according to the current gate opening degree information of the parallel water supply and power generation system and the current water level of the third trunk canal; and controlling a gate opening degree of a target gate according to the target gate linkage control strategy of the parallel water supply and power generation system.

9 Claims, 4 Drawing Sheets

GATE LINKAGE CONTROL METHOD AND DEVICE AND PARALLEL WATER SUPPLY AND POWER GENERATION SYSTEM

TECHNICAL FIELD

The present application relates to the technical field of water diversion projects, and particularly to a gate linkage control method and device and a parallel water supply and power generation system.

BACKGROUND

Water diversion project is a water conservancy project for diverting water from a water source area to a water demand area through a water intake building and a water delivery building by an engineering technology. With the construction of an intelligent water network, a comprehensive function of the water conservancy project has been paid more and more attention, and the water diversion project should also be adjusted accordingly. A water conservancy project focusing on power generation mainly aims at the utilization of water energy but has low utilization efficiency of water, while a water conservancy project focusing on water supply has high utilization efficiency of water but often ignores the utilization of water energy. A single-target water diversion or power generation project can no longer meet the needs of social development, and a water conservancy project with comprehensive utilization of water and water energy is a future development direction. However, the more functions the water diversion project has, the more the water diversion gates are involved. Therefore, how to realize the multi-gate linkage control of the multi-functional water diversion project has become the key research content.

In the prior art, gate control is usually implemented by a manual control method, but the manual control method is only suitable for a single gate scene, and when the water diversion project involves multiple gates, the prior art will not be able to realize accurate control.

SUMMARY

The present application provides a gate linkage control method and device and a parallel water supply and power generation system, so as to overcome the defects in the prior art, for example, a gate opening degree cannot be accurately controlled in the case that a water diversion project involves multiple gates.

As a first aspect of the present application, a gate linkage control method is proposed, applied to a parallel water supply and power generation system, the parallel water supply and power generation system comprising a reservoir, a first trunk canal, a second trunk canal, a stilling basin and a third trunk canal, the first trunk canal and the second trunk canal being connected in parallel, the reservoir being located in upstream positions of the first trunk canal and the second trunk canal, the stilling basin being located in downstream positions of the first trunk canal and the second trunk canal, a first gate being arranged between the first trunk canal and the reservoir, the second trunk canal being sequentially provided with a power generation tunnel and a generator set along a water flow direction, a second gate being arranged between the power generation tunnel and the generator set, and water flows in the first trunk canal and the second trunk canal flowing into the third trunk canal through the stilling basin, wherein the method comprises the following steps of acquiring current gate opening degree information of the parallel water supply and power generation system and a current water level of the third trunk canal, wherein the current gate opening degree information comprises current first gate opening degree information and current second gate opening degree information;

determining a target gate linkage control strategy of the parallel water supply and power generation system according to the current gate opening degree information of the parallel water supply and power generation system and the current water level of the third trunk canal, controlling a gate opening degree of a target gate according to the target gate linkage control strategy of the parallel water supply and power generation system.

Optionally, the determining the target gate linkage control strategy of the parallel water supply and power generation system according to the current gate opening degree information of the parallel water supply and power generation system and the current water level of the third trunk canal, comprises:

acquiring a target water level of the third trunk canal;

determining a gate linkage control strategy set of the parallel water supply and power generation system according to a difference value between the current water level and the target water level and the current gate opening degree information based on a preset hydrodynamic model;

screening a target gate linkage control strategy with the minimum water level error from the gate linkage control strategy set based on a preset optimized objective function of a water level error.

Optionally, the Screening the Target Gate Linkage Control Strategy with the Minimum Water Level Error from the Gate Linkage Control Strategy Set Based on the Preset Optimized Objective Function of the Water Level Error, Comprises:

screening the target gate linkage control strategy with the minimum water level error from the gate linkage control strategy set based on the following preset optimized objective function of the water level error.

$$U^* = \underset{U}{\operatorname{argmin}} J(U, x_0)$$

$$J(U, x_0) = \sum_{k=0}^{N_h-1} \left(x^T(k)Qx(k) + Q_l x(k) + u^T(k)Ru(k)\right) + x^T(N_h)Qx(N_h)$$

wherein, $U^*$ represents the target gate linkage control strategy, U represents any gate linkage control strategy in the gate linkage control strategy set, $x_0$ represents an initial water level of the third trunk canal corresponding to the gate linkage control strategy U, $J(U,x_0)$ is a water level error calculation function, k is a time step, $N_h$ is a prediction interval, and the prediction interval comprises a plurality of time steps, x(k) is a predicted water level value of the third trunk canal under the time step k, Q and R are preset constant weighting matrices of a quadratic deviation penalty, $Q_l$ is a preset constant weighting matrix of a linear penalty, T is a transposition symbol, u(k) is a gate opening degree of each gate represented by the gate linkage control strategy U, and $x(N_h)$ is a final error between the predicted water level value and a target water level value in the prediction interval.

Optionally, the third trunk canal is composed of a plurality of sub-trunk canals connected in series, the stilling basin is arranged between the sub-trunk canals, the third trunk canal is provided with a plurality of outlet gates, and the target gate comprises the outlet gate, and the method further comprises the following steps of:

predicting a differential error of each stilling basin in the case that the gate opening degree of the target gate is controlled according to the target gate linkage control strategy based on a preset calculation formula of the differential error;

optimizing the target gate linkage control strategy when the differential error of any stilling basin is not less than a preset threshold of the differential error.

Optionally, the Predicting the Differential Error of Each Stilling Basin in the Case that the Gate Opening Degree of the Target Gate is Controlled According to the Target Gate Linkage Control Strategy Based on the Preset Calculation Formula of the Differential Error, Comprises:

predicting the differential error of each stilling basin in the case that the gate opening degree of the target gate is controlled according to the target gate linkage control strategy based on the following preset calculation formula of the differential error.

$$D_j = e_j - \frac{1}{n-1}\left(\sum\nolimits_{i=1}^{n-1} e_i\right)$$

wherein, $D_j$ is a differential error of a stilling basin j, $e_j$ is a water level error of the stilling basin j, n a total number of stilling basins, and $e_i$ is a water level error of other stilling basins except the stilling basin j.

Optionally, the Controlling the Gate Opening Degree of the Target Gate According to the Target Gate Linkage Control Strategy of the Parallel Water Supply and Power Generation System, Comprises:

controlling the gate opening degree of the target gate according to the target gate linkage control strategy of the parallel water supply and power generation system based on a preset PID controller.

Optionally, further comprising the following step of:

optimizing a gain parameter of the preset PID controller based on the following formula according to a preset period.

$$O_h = W_0^h + \sum_{n_1=1}^{N_1} \cdots \sum_{n_{mc}=1}^{N_{mc}} \sum_{j=1}^{l} W_{n_1,\ldots,n_{mc}}^j H_j$$

wherein, $O_h$ is the gain parameter, $$W_0^h$$

is a neural network bias after self-adaptive adjustment, $N_1$ is a neuron sequence length of a $1^{st}$ hidden layer of a neural network, $N_{mc}$ is a neuron sequence length of an $mc^{th}$ hidden layer of the neural network, mc represents a total number of hidden layers of the neural network, l=3, $$W_{n_1,\ldots,n_{mc}}^j$$

is a neural network connection weight after self-adaptive adjustment, and $H_j$ is an intermediate variable.

Optionally, after controlling the gate opening degree of the target gate according to the target gate linkage control strategy of the parallel water supply and power generation system, the method further comprises the following steps of:

monitoring a current actual opening degree of each target gate;

determining a target gate opening degree correction strategy according to a deviation between the current actual opening degree of each target gate and the target opening degree of each target gate represented by the target gate linkage control strategy.

As a second aspect of the present application, a gate linkage control device is proposed, applied to a parallel water supply and power generation system, the parallel water supply and power generation system comprising a reservoir, a first trunk canal, a second trunk canal, a stilling basin and a third trunk canal, the first trunk canal and the second trunk canal being connected in parallel, the reservoir being located in upstream positions of the first trunk canal and the second trunk canal, the stilling basin being located in downstream positions of the first trunk canal and the second trunk canal, a first gate being arranged between the first trunk canal and the reservoir, the second trunk canal being sequentially provided with a power generation tunnel and a generator set along a water flow direction, a second gate being arranged between the power generation tunnel and the generator set, and water flows in the first trunk canal and the second trunk canal flowing into the third trunk canal through the stilling basin, wherein the device comprises:

an acquisition module configured for acquiring current gate opening degree information of the parallel water supply and power generation system and a current water level of the third trunk canal, wherein the current gate opening degree information comprises current first gate opening degree information and current second gate opening degree information;

a determination module configured for determining a target gate linkage control strategy of the parallel water supply and power generation system according to the current gate opening degree information of the parallel water supply and power generation system and the current water level of the third trunk canal;

a control module configured for controlling a gate opening degree of a target gate according to the target gate linkage control strategy of the parallel water supply and power generation system.

As a third aspect of the present application, a parallel water supply and power generation system is proposed, comprising:

a reservoir, a first trunk canal, a second trunk canal, a stilling basin and a third trunk canal;

the first trunk canal and the second trunk canal are connected in parallel, the reservoir is located in upstream positions of the first trunk canal and the second trunk canal, and the stilling basin is located in downstream positions of the first trunk canal and the second trunk canal;

a first gate is arranged between the first trunk canal and the reservoir;

the second trunk canal is sequentially provided with a power generation tunnel and a generator set along a water flow direction, and a second gate is arranged between the power generation tunnel and the generator set;

water flows in the first trunk canal and the second trunk canal flow into the third trunk canal through the stilling basin;

further comprising an electronic device, wherein the electronic device comprises at least one processor and a storage;

the storage stores a computer executive instruction;

the at least one processor executes the computer executive instruction stored in the storage, so that the at least one processor executes the method according to any one of claims 1 to 8.

the storage stores a computer executive instruction;

the at least one processor executes the computer executive instruction stored in the storage, so that the at least one processor executes the method described in the first aspect and the various possible designs of the first aspect.

As a fourth aspect of the present application, a computer-readable storage medium is also proposed, the computer-readable storage medium stores a computer executive instruction, and when executed by a processor, the computer executive instruction implements the gate linkage control method described in the first aspect and the various possible designs of the first aspect.

The technical solution of the present application has the following advantages.

The present application provides a gate linkage control method and device and a parallel water supply and power generation system, and the method is applied to the parallel water supply and power generation system. The parallel water supply and power generation system comprises a reservoir, a first trunk canal, a second trunk canal, a stilling basin and a third trunk canal, the first trunk canal and the second trunk canal are connected in parallel, the reservoir is located in upstream positions of the first trunk canal and the second trunk canal, the stilling basin is located in downstream positions of the first trunk canal and the second trunk canal, a first gate is arranged between the first trunk canal and the reservoir, the second trunk canal is sequentially provided with a power generation tunnel and a generator set along a water flow direction, a second gate is arranged between the power generation tunnel and the generator set, and water flows in the first trunk canal and the second trunk canal flow into the third trunk canal through the stilling basin. The method comprises the following steps of: acquiring current gate opening degree information of the parallel water supply and power generation system and a current water level of a third trunk canal, the current gate opening degree information comprising current first gate opening degree information and current second gate opening degree information: determining a target gate linkage control strategy of the parallel water supply and power generation system according to the current gate opening degree information of the parallel water supply and power generation system and the current water level of the third trunk canal; and controlling a gate opening degree of a target gate according to the target gate linkage control strategy of the parallel water supply and power generation system. According to the method provided by the solution above, the target gate linkage control strategy of the parallel water supply and power generation system is determined according to the current gate opening degree information of the parallel water supply and power generation system and the current water level of the third trunk canal, so that gate control efficiency is improved while realizing accurate gate linkage control of a multi-gate water diversion project.

BRIEF DESCRIPTION OF THE DRAWINGS

The present invention is further described hereinafter with reference to the drawings and embodiments.

DETAILED DESCRIPTION OF SOME EMBODIMENTS

Figure 1:
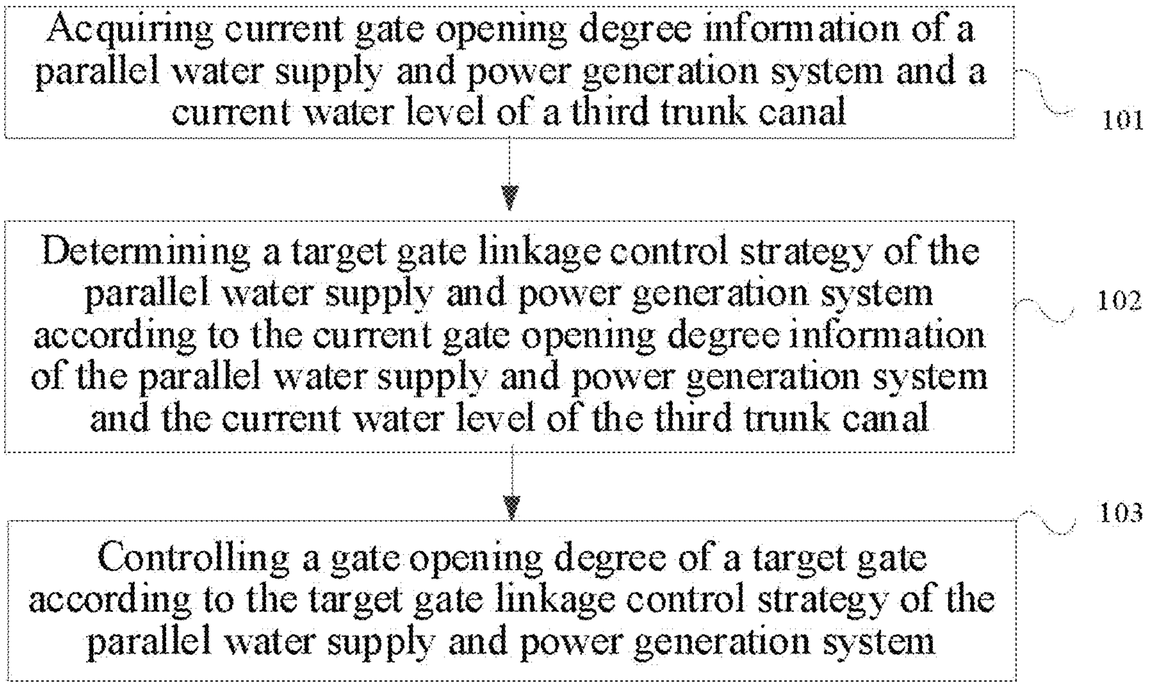
FIG. 1 is a flow chart of a gate linkage control method provided by an embodiment of the present application.

In order to make the objectives, the technical solutions and the advantages of the embodiments of the present application more clear, the technical solutions in the embodiments of the present application will be illustrated clearly and completely hereinafter with reference to the accompanying drawings in the embodiments of the present application. Apparently, the embodiments described are merely some but not all of the embodiments of the present application. Based on the embodiments of the present application, all other embodiments obtained by those of ordinary skills in the art without going through any creative work should fall within the scope of protection of the present application.

Water diversion project is a water conservancy project for diverting water from a water source area to a water demand area through a water intake building and a water delivery building by an engineering technology. The development of the water diversion project may be roughly divided into three stages. In a first stage, a water diversion method is to directly dig a canal in a natural water system for water diversion, which cannot effectively control a water diversion amount. In a second stage, water diversion with dam is developed, which improves a manual ability of controlling a water amount, and this water diversion method is widely used but may cause damage to the ecological environment. In a third stage, with the construction of an intelligent water network, a comprehensive function of a water conservancy project has been paid more and more attention, and the water diversion project should also be adjusted accordingly A water conservancy project focusing on power generation mainly aims at the utilization of water energy but has low utilization efficiency of water, while a water conservancy project focusing on water supply has high utilization efficiency of water but often ignores the utilization of water energy. A single-target water diversion or power generation project can no longer meet the needs of social development, and a water conservancy project with comprehensive utilization of water and water energy is a future development direction.

A project of connecting river and lake water systems aims at maintaining water conservancy connection and material circulation between different water bodies to maintain, reconstruct or construct a water flow connecting channel meeting specific functions and targets through natural and human-driven actions based on the natural water system. A traditional water diversion project has certain water system connectivity, and the water diversion project is an important way to solve the serious shortage of water resources in some areas caused by the uneven distribution of water resources in time and space. Nowadays, a number of water diversion projects is increasing, which causes many problems while bringing economic benefits. From the development of current stage, water resources have a very important impact on people's production and life, and in order to improve the economic benefits of the water diversion project, it is necessary to upgrade the design, operation and management of the project to meet the needs of social development and realize scientific dispatching. In a small scale, there is water distribution between irrigation areas in a basin, wherein the unreliability of water supply by an irrigation canal often leads to excessive upstream water of the irrigation canal and insufficient downstream water of the irrigation canal, and the shortage of water resources in a downstream area will affect the lives of downstream residents, and in a large scale, there is water transfer between basins. Nowadays, with the promotion of the project of connecting river and lake water systems, the traditional water diversion project has basically failed to meet the development needs of the new era, and the single-target water diversion project will be eliminated, so that the multi-target and multi-function water conservancy project is the future development direction.

Because a water supply canal to be constructed for water delivery is mainly used for water supply, this type of canal fails to make full use of falling energy of water during construction, so that there is still room for improvement in the utilization efficiency of water resources. With the advancement of the intelligent water network, the water conservancy project often needs to undertake more functions, and meanwhile, the degree of intelligence of the project should be improved as much as possible. In addition, in terms of connecting river and lake water systems, the water conservancy project should improve a water amount adjustment capacity as much as possible when meeting construction needs. First of all, from a perspective of project structure, previous water diversion projects are to take water from a natural river, wherein only the water is taken but the water energy is not utilized, and the water amount cannot be controlled well by this water intake method, wherein a water amount of a branch canal is controlled by a water amount of a trunk canal, and it is difficult to adjust the water amount of the trunk canal well. A relatively stable water flow can be obtained by the method of water diversion with dam, but the construction of dam is time-consuming and labor-intensive, which may have an impact on the environment. Therefore, in the design of the water diversion project, the water diversion with dam and the water diversion without dam are combined, a water diversion scheme is rationally designed according to topographic and hydrological characteristics, and a generator set is added in a water diversion process, so as to realize the utilization of water energy. The method of water diversion with dam has a large investment, the water and the water energy cannot be taken into account in utilization, and it is difficult to construct a hydropower station in the case of small water amount. During water supply by the hydropower station, water diversion is carried out in an upstream position of a reservoir area, which is a water diversion process mainly based on power generation, and this method is only suitable for large rivers, through which the water amount can be stably adjusted when the water amount is particularly sufficient and redundant.

In order to realize parallel linkage control of water supply and power generation, a complete control system is needed, and the control system needs to have a clear perception of an overall situation of the water diversion project. Therefore, it is necessary to arrange a sensor in the project to acquire data and monitor an operation state, and after the control system acquires the water level data, the control system controls a gate. A monitoring index is a scientific criterion to judge whether the operation state of the project is normal, and a monitoring index of operation safety of an effect size is drawn up by using project monitoring data, through which a safety state of the project can be effectively identified and a potential safety hazard of the project can be found in time, so as to realize the health diagnosis and safety early warning of the project. The monitoring index is also a judgment basis for reasonable adjustment of the project, which is not limited to the state monitoring of the project by a monitoring device, but also comprises water consumption information of all parts of the project, and because water amount adjustment of a canal has a characteristic of hysteresis, these information need to be acquired in advance for a professional to adjust the water amount in advance. Manifestations of the monitoring index comprise a quantitative value and a qualitative criterion. The quantitative value is mainly a safety limit value specified for a value of a single monitoring point and a single monitoring effect size and a change trend thereof, and the qualitative criterion is several qualitative evaluation criteria or models formed by integrating monitoring information of multiple monitoring points and multiple effect sizes.

The quantitative monitoring index is intuitive and clear, and convenient to use, but the quantitative monitoring index aims at the single monitoring point and monitors a local state A canal embankment of the water diversion project is long in route, large in project scale, and complicated in construction and operation conditions, and it is difficult to comprehensively monitor the project safety only by the quantitative value index of the single monitoring point, so that it is necessary to comprehensively consider the monitoring information of the multiple monitoring points and the multiple monitoring effect sizes to implement the overall safety monitoring of the project. Meanwhile, the project safety itself is an uncertain concept with a fuzzy attribute, and it is difficult to define the project safety with an accurate and absolute value on a boundary. In addition, not all indexes representing the project safety may be measured by the quantitative value, and some indexes need to be expressed by a qualitative method Therefore, the qualitative safety evaluation criteria should also be studied while studying the monitoring index of the quantitative value.

The most intuitive performance of an abnormal operation state of the project is an abnormal measured value of the monitoring effect size. The abnormality of a measured value of the single monitoring point is mainly manifested in four basic forms, an abnormal numerical value, an abnormal change process, an abnormal change trend and an abnormal change law. Studying the abnormal manifestations of the measured value may provide scientific basis for identifying an abnormal phenomenon and a potential safety hazard of the project, and provide classification basis for establishing the evaluation criteria based on multi-index fusion. When the same type or multiple types of abnormal phenomena occur under multiple monitoring points and multiple effect sizes at the same time, the operation state of the project may be comprehensively judged by analyzing an internal correlation between these abnormal phenomena under different monitoring points and different effect sizes.

Gate adjustment is used for water amount distribution in most existing water amount control methods, and gate control is usually implemented by a manual control method. Although some studies have made some progress in gate automatic control and online control, this type of technology only solves the problem of manual control, which is of limited help to multi-gate control involving a water delivery system A water supply and power generation parallel linkage control method is a multi-target nonlinear system, which should be regarded as a whole to ensure the stability of the whole, and moreover, multiple nodes in the method should be adjusted accurately, and all nodes are under linkage control to work jointly. Similarly, the project system and the natural system also need to coordinate with each other, and only in this way can the needs of the project itself be met to realize continuous development without causing disastrous damage to the surrounding environment.

With the development of Internet of Things technology, an application of the method in canal gate control is gradually being developed. An intelligent gate control system designed by the Internet of Things technology can realize remote control and real-time monitoring of water transfer in an irrigation area, thus improving a management level of water transfer irrigation in the irrigation area and improving a utilization rate of water resources in the irrigation area. However, there are still some shortcomings in this system. On one hand, an operation instruction is issued by manual operation; and on the other hand, the gate control depends on the judgment of artificial knowledge and experience, so that there is still a lack of scientific and reasonable gate control.

An integrated monitoring and control gate integrates a gate, an on-off device, a flow measuring device, a control device and a power supply device, and has the functions of gate opening and closing, flow rate calculation, remote control and communication. The gate of the canal system is remotely monitored and controlled, or water delivery and distribution amounts of the gate are automatically adjusted under given flow water levels or opening degrees through a computer and a communication network system in combination with the calculation of gate opening degree, canal water level, instantaneous flow rate and duration water amount, so as to realize the automation of flow rate monitoring and control of gaging water section or straight opening of a canal. With the popularization of technology, there are more and more types of devices and flow measurement control methods, and product qualities and technical requirements are various. In a practical application process of the gate, there are some problems, such as poor flow measurement accuracy, obstacles in signal transmission, and many failures in automatic opening and closing of the gate. The application of the integrated monitoring and control gate can accelerate the modernization of the irrigation area and realize the automation and intelligence of water delivery and distribution in the irrigation area. However, this technology mainly solves the problem of water diversion control of the canal in the irrigation area, and is less helpful to the linkage control between inlet and outlet gates of the canal. For a trunk canal, water inflow and outflow amounts should be in a state of dynamic balance, and reasonable control is also needed when the water amounts change. When two gates are controlled separately, it is possible to cause an excessive water amount, insufficient water supply or a water level fluctuation.

In the modernization of irrigation canals, extensive automatic control technology has been put forward, designed, tested and implemented. Decentralized local controllers use a single input and single output (SISO) behavior, and calculate a control action by a measured value close to the gate only. In this respect, many scholars have made different studies on the use of a sluice mechanical gate, and obtained applications of local classical controllers in different schemes. Because of a large scale of a main irrigation canal and the urgent need to use modern operation strategies (such as water supply on demand, and combined operation of an online reservoir and surface and underground water), centralized controllers have been widely used in water level control of the main irrigation canal. At present, many irrigation canals are still in manual operation, which, in most cases, is not only caused by the problem of expensive implementation of the automation system, but also caused by a damage often occurring on a field control device and a very high maintenance cost Therefore, a new method for studying the automation management of the canal is to realize water management by an intelligent method, which takes modern control as a reliable decision support system to improve manual canal control. However, due to the spatial diversity, it has been controversial to choose appropriate control methods for a main canal and a secondary canal. On one hand, it is difficult to adjust a linkage relationship between the canal and the irrigation area by a simple method; and on the other hand, water consumption in the irrigation area is not uniform, leading to the variety of water consumption in the irrigation area, which is a difficult point for water flow control with hysteresis.

At present, most methods for measuring a flow rate of an open canal in the irrigation area are mainly hydraulic methods for measure the flow rate by using a standard measuring weir and flume, a hydraulic structure or a manually controlled section, and there are still technical problems in data extraction, data transmission, data analysis and other aspects in means, methods and device selection of water intake measurement and detection. Controlling an upstream water level of the gate of the canal is the most commonly used automation method for the canal in practice. If a correct flow (which is namely a sum of downstream demands) enters a head gate, this method will correctly distribute the flow to all downstream gates. An error of inflow of the canal will lead to an error of available flow in the last basin, which either leads to canal leakage or insufficient flow at an outlet of irrigation area. Then, an operator needs to change an inflow of a pipeline to correct this error of flow. In most cases, this control is done manually, although automatic control is becoming more and more common. By automatic control, if a controller of a single gate is not properly tuned, disturbance amplification may be generated, that is, a position and a water level of the gate oscillate with the increase of amplitude in a downstream direction. This problem can be avoided if controllers of all canal basins are adjusted at the same time. A usual way to realize upstream automatic control is to establish a simulation model of the canal, determine a response of the canal through a simulation test, develop control parameters through optimization, and then test the suitability of the controller through simulation. When adapting to a real pipeline, the parameters will be further adjusted through testing, which may be a time-consuming process, thus being an expensive process.

A certain control ability is needed to adjust a flow rate of a canal of free surface flow to meet the needs of farmers at specific diversion points, a flow transient is studied, especially when time and space demands change greatly Usually, the operator can only measure a water depth in several places of the canal, and in order to determine initial conditions of the model, it is necessary to know water depths and velocities of all discrete points A main control objective of the irrigation canal is to supply water to users in a fair way. One reason why the control objective is not fully realized is the difficulty in measuring the flow rate Although the flow rate measurement is an old problem, the problem is still under study. The gate model is used as an indirect method for measuring a local flow rate, these structures can not only adjust the flow rate, but also distribute water in the irrigation area, and also have the function of flow rate measurement. Under some submergence conditions, the program is still not completely accurate. In addition, when there are multiple gates working in parallel, there are additional problems in the flow rate measurement. If one gate is under free flow and the other gate is in a transition zone, there may be lateral flow, and flow rate estimation based only on gate opening and upstream and downstream water levels may become a thorny problem.

Aiming at the above problems, an embodiment of the present application provides a gate linkage control method and device and a parallel water supply and power generation system, and the method is applied to the parallel water supply and power generation system. The parallel water supply and power generation system comprises a reservoir, a first trunk canal, a second trunk canal, a stilling basin and a third trunk canal, the first trunk canal and the second trunk canal are connected in parallel, the reservoir is located in upstream positions of the first trunk canal and the second trunk canal, the stilling basin is located in downstream positions of the first trunk canal and the second trunk canal, a first gate is arranged between the first trunk canal and the reservoir, the second trunk canal is sequentially provided with a power generation tunnel and a generator set along a water flow direction, a second gate is arranged between the power generation tunnel and the generator set, and water flows in the first trunk canal and the second trunk canal flow imo the third trunk canal through the stilling basin. The method comprises the following steps of acquiring current gate opening degree information of the parallel water supply and power generation system and a current water level of a third trunk canal, the current gate opening degree information comprising current first gate opening degree information and current second gate opening degree information: determining a target gate linkage control strategy of the parallel water supply and power generation system according to the current gate opening degree information of the parallel water supply and power generation system and the current water level of the third trunk canal; and controlling a gate opening degree of a target gate according to the target gate linkage control strategy of the parallel water supply and power generation system. According to the method provided by the solution above, the target gate linkage control strategy of the parallel water supply and power generation system is determined according to the current gate opening degree information of the parallel water supply and power generation system and the current water level of the third trunk canal, so that gate control efficiency is improved while realizing accurate gate linkage control of a multi-gate water diversion project.

The following specific embodiments may be combined with each other, and the same or similar concepts or processes may not be repeated in some embodiments. Embodiments of the present invention are described hereinafter with reference to the drawings.

An embodiment of the present application provides a gate linkage control method, applied to a parallel water supply and power generation system. The parallel water supply and power generation system comprises a reservoir, a first trunk canal, a second trunk canal, a stilling basin and a third trunk canal, the first trunk canal and the second trunk canal is connected in parallel, the reservoir is located in upstream positions of the first trunk canal and the second trunk canal, the stilling basin is located in downstream positions of the first trunk canal and the second trunk canal, a first gate is arranged between the first trunk canal and the reservoir, the second trunk canal is sequentially provided with a power generation tunnel and a generator set along a water flow direction, a second gate is arranged between the power generation tunnel and the generator set, and water flows in the first trunk canal and the second trunk canal flow into the third trunk canal through the stilling basin. The method is used for multi-gate linkage control of the parallel water supply and power generation system. An executive body of the embodiment of the present application is an electronic device, such as a server, a desktop computer, a notebook computer, a tablet computer and other electronic devices capable of being used for multi-gate linkage control of the parallel water supply and power generation system.

FIG. 1 is a flow chart of the gate linkage control method provided by the embodiment of the present application, and the method comprises the following steps.

In step 101, current gate opening degree information of the parallel water supply and power generation system and a current water level of the third trunk canal are acquired.

The current gate opening degree information comprises current first gate opening degree information and current second gate opening degree information.

In step 102, a target gate linkage control strategy of the parallel water supply and power generation system is determined according to the current gate opening degree information of the parallel water supply and power generation system and the current water level of the third trunk canal.

Specifically, a hydrodynamic model of the parallel water supply and power generation system may be constructed in advance according to hydrodynamic information of the parallel water supply and power generation system, the gate opening degree information is taken as an input of the hydrodynamic model, the water level of the third trunk canal is taken as an output of the hydrodynamic model, and a change of the water level of the third trunk canal is adjusted by controlling a change of the gate opening degree until the water level of the third trunk canal reaches a target water level.

It should be noted that the parallel water supply and power generation system provided by this embodiment is based on traditional single-canal water delivery, which is added with the generator set to effectively utilize potential energy of falling water. After the generator set is added, a water delivery capacity of the canal may be reduced to some extent due to an influence of the generator set, and there may be a situation that the generator set fails to deliver water. Therefore, another trunk canal is laid on one side of the original trunk canal, and the two trunk canals cooperate to deliver water. Under normal circumstances, the trunk canal of the generator set is mainly responsible for water supply, and the trunk canal on one side assists in adjustment. Under special circumstances, the trunk canal on one side is responsible for water supply. The two canals follow the same construction standard, so that the two canals are both capable of meeting a downstream water demand. After the generator set and the trunk canal are added, a number of gates is also increased accordingly, and a gate control mode should also be adjusted accordingly. A monitoring device is arranged in a position of the reservoir to monitor a gate opening degree, a monitoring device is arranged in a position of the generator set to monitor a flow rate change of the generator set, and a water level monitoring equipment is arranged along the trunk canal in the downstream position to feed back the water level information to the control system in real time. Data of the three monitoring devices are combined through a control algorithm to find an optimal gate control strategy, a result is sent to an executive mechanism to control the gate for adjustment, so as to complete the water distribution requirement.

Specifically, in one embodiment, after the current gate opening degree information of the parallel water supply and power generation system and the current water level of the third trunk canal are acquired, working condition information of the generator set and a flow rate of the generator set may also be acquired, and whether the second trunk canal where the generator set is located supplies water normally or not is judged according to the working condition information of the generator set, so as to obtain a working condition detection result of the second trunk canal. Specifically, the current gate opening degree information of the parallel water supply and power generation system, the current water level of the third trunk canal, the working condition detection result of the second trunk canal and the flow rate of the generator set may be combined to determine the target gate linkage control strategy of the parallel water supply and power generation system.

In step 103, a gate opening degree of a target gate is controlled according to the target gate linkage control strategy of the parallel water supply and power generation system.

Specifically, the gate opening degree of the target gate may be adjusted according to a target gate opening degree of each target gate represented by the target gate linkage control strategy of the parallel water supply and power generation system, wherein the target gate comprises a first gate and/or a second gate.

Specifically, after a power generation system is added into a water supply canal, the whole project becomes more complicated, and power generation should be taken into account while meeting the water supply requirement. The two projects have different requirements for water amount, so that it is necessary to carry out linkage control on the two projects. A way to realize water amount control is to control the gate, and the number of gates in the whole project will be increased after the generator set is added. Moreover, because the project structure becomes more complicated, it is difficult to apply the commonly used method of manual gate adjustment, and it is difficult to link the gates through manual control. Therefore, the control system is improved, the control algorithm is used to collect changes of water levels and flow rates of the trunk canal and the generator set, and the gate opening degree is calculated and output through the control algorithm, so as to carry out linkage adjustment on the water diversion gate. The collection of the water level information is mainly monitored by setting up a monitoring station fifty meters from the downstream position of the gate, and because the canals are all manual canals, the water level is relatively stable when there are no water inflow and outflow, so that it is not necessary to set up the monitoring station. The gate opening degree is monitored by setting up a monitoring device in a position of the gate, and the gate opening degree is fed back to a control subsystem, so as to ensure that the control requirement is met.

On the basis of the above embodiment, as an implementable way, in one embodiment, the determining the target gate linkage control strategy of the parallel water supply and power generation system according to the current gate opening degree information of the parallel water supply and power generation system and the current water level of the third trunk canal, comprises:

step 1021: acquiring a target water level of the third trunk canal;

step 1022: determining a gate linkage control strategy set of the parallel water supply and power generation system according to a difference value between the current water level and the target water level and the current gate opening degree information based on a preset hydrodynamic model;

step 1023: screening a target gate linkage control strategy with the minimum water level error from the gate linkage control strategy set based on a preset optimized objective function of a water level error.

It should be noted that the target water level of the third trunk canal may be determined according to a water demand of the third trunk canal. The gate linkage control strategy set determined on the basis of the preset hydrodynamic model comprises a variety of gate linkage control strategies, and a simulation result of the preset hydrodynamic model represents that all these gate linkage control strategies may make the water level of the third trunk canal reach the target water level.

Specifically, a water flow state of the canal may be simulated on the basis of the hydrodynamic model to obtain the change of the water level of the third trunk canal, and input and output water amounts satisfying safe operation of the canal are found by changing input and output water amounts of the canal and observing a fluctuation state of the water level, so as to further determine the gate opening degree.

Specifically, in one embodiment, in order to ensure the reliability of the target gate linkage control strategy adopted, the target gate linkage control strategy with the minimum water level error may be screened from the gate linkage control strategy set based on the following preset optimized objective function of the water level error:

$$U^* = \underset{U}{\operatorname{argmin}} J(U, x_0)$$

$$J(U, x_0) = \sum_{k=0}^{N_h-1} \left(x^T(k)Qx(k) + Q_l x(k) + u^T(k)Ru(k)\right) + x^T(N_h)Qx(N_h)$$

wherein, U* represents the target gate linkage control strategy, U represents any gate linkage control strategy in the gate linkage control strategy set, $x_0$ represents an initial water level of the third trunk canal corresponding to the gate linkage control strategy U, $J(U, x_0)$ is a water level error calculation function, k is a time step, $N_h$ is a prediction interval, and the prediction interval comprises a plurality of time steps, x(k) is a predicted water level value of the third trunk canal under the time step k, Q and R are preset constant weighting matrices of a quadratic deviation penalty. $Q_l$ is a preset constant weighting matrix of a linear penalty, T is a transposition symbol, u(k) is a gate opening degree of each gate represented by the gate linkage control strategy U, and $x(N_h)$ is a final error between the predicted water level value and a target water level value in the prediction interval.

Parameter values of Q and R may be determined according to the current water level of the third trunk canal, and the time step, a prediction period and a threshold of a differential error are preset.

Further, in one embodiment, the third trunk canal is composed of a plurality of sub-trunk canals connected in series, the stilling basin is arranged between the sub-trunk canals, the third trunk canal is provided with a plurality of water outlet gates, and the target gate comprises the water outlet gate Because certain adjustment time is needed whether the water level of the third trunk canal is lowered or raised, in order to avoid sharp rise or drop of the water level from affecting the safety of the parallel water supply and power generation system, a differential error of each stilling basin in the case that the gate opening degree of the target gate is controlled according to the target gate linkage control strategy may be predicted based on a preset calculation formula of the differential error, and when the differential error of any stilling basin is not less than a preset threshold of the differential error, the target gate linkage control strategy is optimized.

Specifically, in one embodiment, the differential error of each stilling basin in the case that the gate opening degree of the target gate is controlled according to the target gate linkage control strategy may be predicted based on the following preset calculation formula of the differential error $$D_j = e_j - \frac{1}{n-1}\left(\sum\nolimits_{i=1}^{n-1} e_i\right)$$

wherein, $D_j$ is a differential error of a stilling basin j, $e_j$ is a water level error of the stilling basin j, n a total number of stilling basins, and $e_i$ is a water level error of other stilling basins except the stilling basin j.

Specifically, when the differential error of any stilling basin is not less than the preset threshold of the differential error, it is determined that a water level change speed of the third trunk canal is relatively large, and an opening degree adjustment speed of the target gate is reduced, so as to reduce the water level change speed of the third trunk canal, thus ensuring canal safety and meeting a water supply demand.

In order to observe the water level change of the canal (the third trunk canal) in time, the hydrodynamic model is used for simulation, and meanwhile, a water level error model prediction control (DE-MPC) method is used for observing the change of the canal water level.

MPC is a control strategy, which is based on continuous re-planning of a control operation sequence that must be implemented within a certain range. Therefore, an MPC controller solves one optimization problem in each time step. In this problem, a mathematical model of the system is used to predict a behavior of the system in a prediction range as a function of an input sequence applied A behavior of a large-scale system, such as an irrigation canal with multiple basins, may be expressed with sufficient accuracy through the following linear time-invariant state space model:

$$x(k+1) = Ax(k) + B_u u(k) + B_d d(k)$$

wherein, x is an error value; u is a gate opening degree value; and d is a vector with known measurable disturbance at the time step k, A is a state transition matrix, $B_u$ is an input to the state matrix, $B_d$ is an interference to the state matrix, and x(k+1) is an error value at the next time step.

In order to optimize the behavior of the system, a cost function is defined, and the function measures a performance of the system according to a control objective. Assuming that there is the problem of balance distribution of water amount in the adjustment and control of the canal, that is, the controller must turn a state of the system into a given reference value, for simplicity, it can be assumed that a source is a state reference without loss of generality. Therefore, the control objective may be mathematically defined as the following function.

$$J(U, x_0) = \sum_{k=0}^{N_h-1} \left(x^T(k)Qx(k) + Q_l x(k) + u^T(k)Ru(k)\right) + x^T(N_h)Qx(N_h)$$

wherein, $N_h$ is a predicted water level value, Q and R are constant weighted matrices, which penalize quadratic deviations relative to vectors of state and manipulated variables, and $Q_l$ is also a constant weighted matrix, which linearly penalize a deviation of a state.

The function depends on a current state $x_0$, which is an initial state of the system evolved according to an applied action sequence, and represented by U=(u(k), u(k+1), . . . , u(k+$N_h$−1)) and an expected error value D=(d(k), d(k+1), . . . , d(k+$N_h$)), otherwise, it will be impossible to predict the state evolution of the system.

The behavior of the controller changes according to a relationship between Q and R. If R is relatively greater than Q, the controller will focus on minimizing the use of the manipulated variable, at the cost of a greater deviation in the state vector, and vice versa, that is, if R is relatively lower than Q, the optimization will lead to an important change of a control action, so as to reduce the deviation of the state vector.

A control action sequence applied in the system may be calculated as minimizing an objective function Therefore, the MPC controller may solve the following optimization problem in each time step:

$$U^* = \underset{U}{\operatorname{argmin}} J(U, x_0)$$

under a restriction by a system model and consideration constraints on the state and manipulated variables, only a first action of calculation is applied, which is namely u*(0) in an actually applied control action sequence U*=(u*(k), u*(k+1), . . . , u*(k+$N_h$−1)). The rest of the sequence provides information about expected evolution of the control sequence, which has not been realized yet. In the next time step, the MPC controller solves the same optimization problem again according to the latest information, and applies a corresponding control action. This process is repeated in each time step in a so-called receding horizon manner.

The control of the flow rate of the canal may also be equivalent to the control of the water level, which is intended to adjust a water level differential error and keep a water level of a basin at a given reference level. The MPC needs a model of the control system to predict a behavior of the controller within a predicted range. For the control objective, an integrator delay (ID) model is used for a canal basin. The ID model divides the canal basin into a uniform fluid with attribute delay time and a backwater section with an attribute storage area. A water level h at a downstream end of the basin is a function of an inflow amount ($q_{in}(k-k_d)$) and a discharge outflow amount ($q_{off-take}(k)$) of the backwater section in which outflow ($q_{out}(k)$) is controlled and a $k_d$ water flow delay time step is considered. A disturbance flow rate originates from a water intake plan of a water user. A discrete time-invariant canal basin model applied in the embodiment of the present application is defined as:

$$h(k+1)=h(k)+\frac{T_c}{A_s}q_{in}(k-k_d)-\frac{T_c}{A_s}q_{out}(k)-\frac{T_c}{A_s}q_{off-take}(k)$$

wherein, h(k+1) is a water level at a time step k+1, h(k) is a water level at a time step k, $A_g$ is an average storage area, and $T_c$ is a control time step.

From the perspective of control, an adjustment error is usually concerned rather than the water level, which makes it possible to penalize a deviation relative to zero. For this reason, it is necessary to introduce a change of a variable and rewrite the equation as:

$$e(k+1)=e(k)+\frac{T_c}{A_s}q_{in}(k-k_d)-\frac{T_c}{A_s}q_{out}(k)-\frac{T_c}{A_s}q_{off-take}(k)$$

In addition to an error related to the target water level, in the embodiment of the present application, a processing method for the differential error of the water level is further improved, so as to obtain the differential error of the water level as follows:

$$D_j=e_j-e_{j+1}=(y_j-SP_j)-(y_{j+1}-SP_{j+1})$$

wherein, $D_j$ is a differential error of water level, $e_j$ is a water level error of j, $e_{j+1}$ is a water level error of j+1, $SP_j$ is a predefined target water level of j, $y_{j+1}$ is a downstream (or long-distance downstream) water level of j+1, $SP_{J+1}$ is a predefined target water level of j+1, $y_j$ is a downstream (or long-distance downstream) water level of a canal basin j, SP is a predefined target water level, and e is the water level error. When an error occurs in one basin, adjacent upstream and downstream basins are disturbed first, so that all basins gradually participate in the control process.

In the embodiment of the present application, in order to accelerate an error sharing process among all basins, a differential error variable is determined by the following formula:

$$D_j=e_j-\frac{1}{n-1}\left(\sum_{i=1}^{n-1}e_i\right)$$

wherein, $e_i$ is a water level error except the water level error of j, and n is a total number of stilling basins.

The controller can react faster in error sharing by using the above formula, because all canal basins participate in the sharing process at the same time.

When the canal water level is predicted and adjusted by the DE-MPC method, it is necessary to measure canal water level data at the current moment or estimate canal water level data at the beginning of control first, so as to obtain a system state at the current moment or a certain moment. After water level information is obtained, appropriate Q and R parameter values are selected according to the need for a faster control action or a more stable control process. The time step, the prediction interval and the differential error threshold for prediction are selected, and the gate opening degree is input as a control variable. After the control is started, the system will formulate a corresponding control plan according to a range of the prediction interval, that is, u(k), u(k+1), . . . , $u(k+N_h-1)$, a control result and a water level error value d(k), d(k+1), . . . , $d(k+N_h)$ of the prediction interval are obtained, and u(k) is selected for control. After the control is finished, the above steps are repeated by taking a moment k+1 as a control starting point according to an actual water level error value, until the optimization is realized.

The above MPC control processes may all be completed in the hydrodynamic model. The hydrodynamic model reads an actual water level and a gate opening degree of each gate first, takes the gate opening degree of each section of the canal as an input variable and takes the water level as an output variable, and influences the change of the canal water level by controlling the change of the gate opening degree, so as to simulate the change of the canal water level. Combined with the DE-MPC control method, the gate of the canal is controlled according to the control strategy formulated by the DE-MPC control method to change the gate opening degree, which is simulated by the hydrodynamic model, and the water level value obtained from a simulation result is input into the DE-MPC for subsequent control. After the whole prediction control process is completed, an optimized target gate linkage control strategy is obtained.

The hydrodynamic model is not mandatorily stipulated, and may be selected according to an actual situation of the canal, such as SMS and WMS, as long as a stage-discharge simulation can be realized.

Specifically, the controlled opening degree of the canal gate can be quickly obtained by the method provided by the embodiment of the present application, and in this method, the water level error is taken as an expected value, and whether there is a problem with the change of the canal water level and whether there is an impact on the canal safety and the normal water supply of upstream and downstream water users can be effectively judged according to the error value. On one hand, a judgment result will assist the control system in adjusting to maintain the water level stability.

On the basis of the above embodiment, in order to further ensure the reliability of gate linkage control, as an implementable way, in one embodiment, the controlling the gate opening degree of the target gate according to the target gate linkage control strategy of the parallel water supply and power generation system, comprises:

step 1031: controlling the gate opening degree of the target gate according to the target gate linkage control strategy of the parallel water supply and power generation system based on a preset PID controller.

Specifically, a gate linkage controller may be constructed by using the preset PID controller, a multi-input and multi-output Fourier series neural network, a multi-input and single-output Fourier series neural network and a system controller. The PID controller establishes an optimal objective function according to a difference value between a current gate opening degree value (the current gate opening degree information) and a target gate opening degree value (the target opening degree represented by the target gate linkage control strategy) input, and outputs the gate opening degree value adjusted by the PID to the system controller in combination with a gain parameter output by the multi-input and multi-output Fourier series neural network. The system controller controls the water diversion gate according to the gate opening degree value adjusted by the PID, and outputs the current gate opening degree value of the system. The multi-input and multi-output Fourier series neural network calculates an approximate value of a Jacobian matrix system according to a neural network connection weight, then calculates a neural network bias after self-adaptive adjustment and the neural network connection weight according to a neural network self-adaptive equation, and finally calculates a gain parameter of the PID controller according to the neural network bias after self-adaptive adjustment and the neural network connection weight, and the gain parameter is output to the PID controller to optimize the PID controller.

The optimal objective function established by the PID controller is specifically as follows:

$$E(k)=\frac{1}{2}e(k)^2$$

$$e(k)=R(k)-y(k)$$

wherein, E(k) is the optimal objective function, e(k) is the difference value between the current gate opening degree value and the target gate opening degree value, R(k) is the current gate opening degree value, and y(k) is the target gate opening degree value.

The neural network self-adaptive equation is specifically as follows.

$$W_0^h(k)=W_0^h(k-1)+\eta e(k)\frac{\partial y(k)}{\partial u(k)}\frac{\partial u(k)}{\partial O_h(k)}$$

wherein, $$W_0^h(k)$$

is the neural network bias after self-adaptive adjustment, $$W_0^h(k-1)$$

is an original neural network bias, η is the neural network connection weight, e(k) is the difference value between the current gate opening degree value and the target gate opening degree value, y(k) is the target gate opening degree value, u(k) is the gate opening degree value adjusted by the PID, $O_h(k)$ is the gain parameter of the PID controller.

Specifically, in one embodiment, in order to improve the control efficiency of the PID controller on the gate, the gain parameter of the present PID controller may be optimized based on the following formula according to a preset period:

$$O_h=W_0^h+\sum_{n_1=1}^{N_1}\cdots\sum_{n_{mc}=1}^{N_{mc}}\sum_{j=1}^{l}W_{n_1,\ldots,n_{mc}}^{j}H_j$$

wherein, $O_h$ is the gain parameter, $$W_0^h$$

is a neural network bias after self-adaptive adjustment, $N_1$ is a neuron sequence length of a 1st hidden layer of a neural network, $N_{mc}$ is a neuron sequence length of an mc[th] hidden layer of the neural network, mc represents a total number of hidden layers of the neural network, l=3, $$W_{n_1,\ldots,n_{mc}}^{j}$$

is a neural network connection weight after self-adaptive adjustment, and $H_j$ is an intermediate variable; and h=1, 2, 3, and gain parameters comprise $K_p$, $K_j$ and $K_d$.

Specifically, in one embodiment, after the gate opening degree of the target gate is controlled according to the target gate linkage control strategy of the parallel water supply and power generation system, a current actual opening degree of each target gate may be monitored; and according to a deviation between the current actual opening degree of each target gate and the target opening degree of each target gate represented by the target gate linkage control strategy, a target gate opening degree correction strategy is determined.

Figure 2:
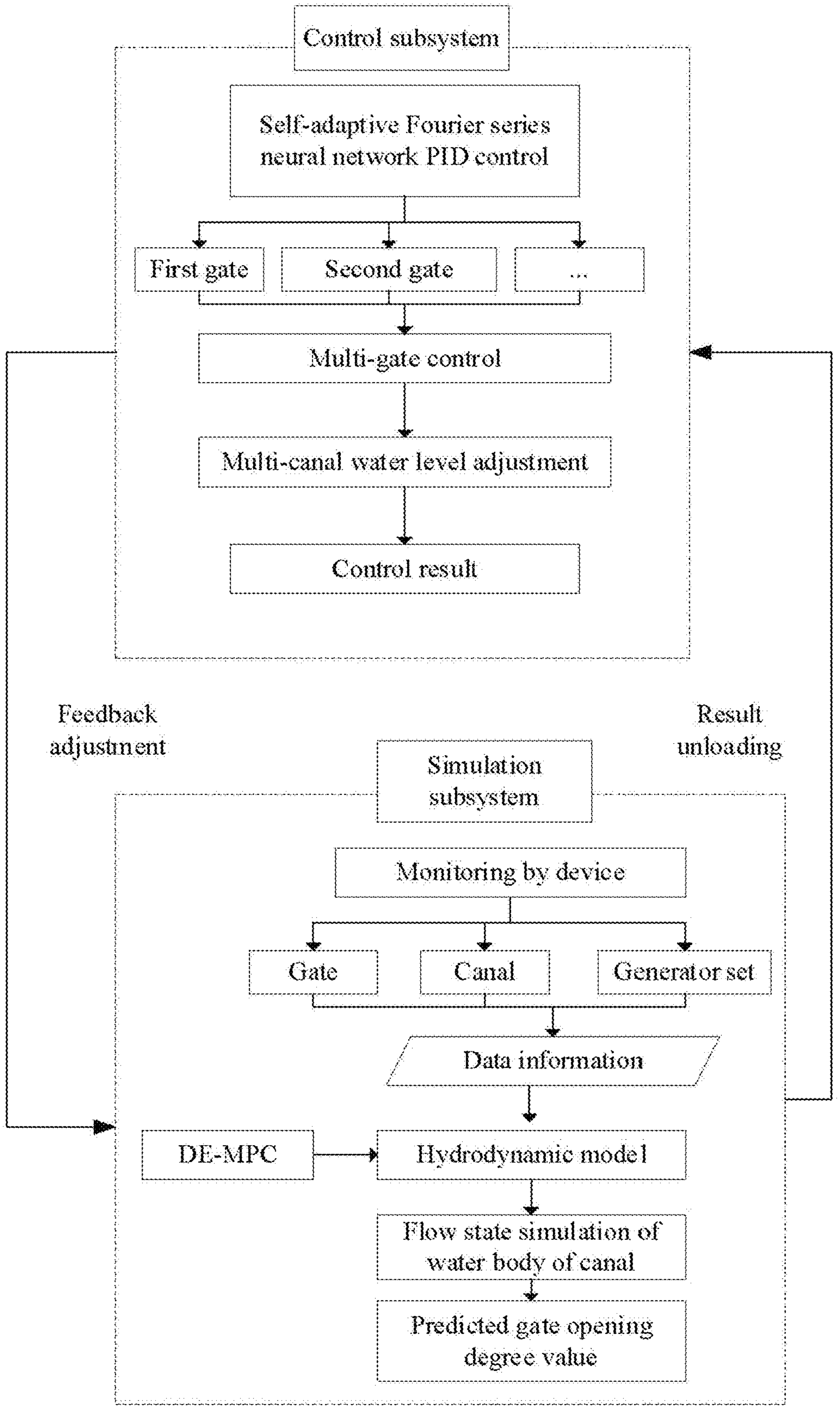
FIG. 2 is a flow chart of an exemplary gate linkage control method provided by the embodiment of the present application.

FIG. 2 is a flow chart of an exemplary gate linkage control method provided by the embodiment of the present application, wherein a control subsystem receives the gate opening degree uploaded by a simulation subsystem to obtain a preset value of the gate opening degree, the controller carries out linkage control on involved target gates, and the monitoring device uploads the current actual gate opening degree to a control subsystem in real time to realize real-time feedback.

Figure 3:
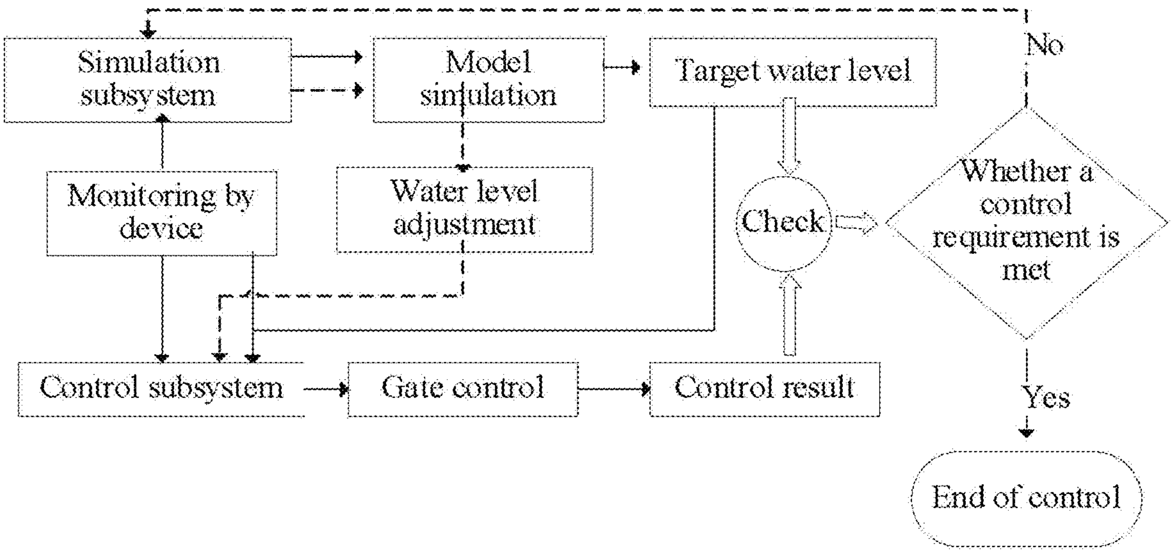
FIG. 3 is a flow chart of another exemplary gate linkage control method provided by the embodiment of the present application.

A feedback system refers to monitoring devices arranged in various positions of the canal for acquiring the gate opening degree, a canal water depth, a discharge flow rate, and other data. The feedback system mainly has two data feedback directions. On one hand, when the control subsystem controls the gate, the feedback system monitors a change of the gate opening degree in real time and uploads data to the control subsystem, and the controller adjusts the control strategy in time according to the data, which means that the target gate opening degree correction strategy is determined. On the other hand, after the control subsystem completes the control process, the actual gate opening degree and the water level are uploaded to the simulation subsystem, and the simulation is carried out by the hydrodynamic model to visually display a control result. FIG. 3 is a flow chart of another exemplary gate linkage control method provided by the embodiment of the present application.

If the control result (a controlled water level) meets an expected requirement (the target water level), the control is finished, and if the control result shows that the canal water level does not meet the expected requirement, the gate opening degree is acquired by the DE-MPC method continuously, and subsequent steps are repeated to continuously control the canal gate until the expected requirement is met.

In order to realize the gate linkage control, combined with multi-objective, nonlinear and time-varying characteristics of canal control, a self-adaptive Fourier series neural network PID (AFSNNPID) control method is used in the embodiment of the present application, which can realize the functions of parameter adjustment and control.

A discrete form of the PID controller is:

$$u(k) = u(k-1) + \left(K_p + \frac{K_d}{T_s} + \frac{K_i T_s}{2}\right)e(k) + \left(\frac{K_i T_s}{2} - 2\frac{K_d}{T_s} - K_p\right)e(k-1) + \frac{K_d}{T_s}e(k-2)$$

wherein, u(k) is the gate opening degree value, k is the time step, e(k) is a gate opening degree error, $K_p$, $K_i$ and $K_d$ are the gain parameters of the PID, which affect the gate control efficiency, and $T_s$ is a sampling period.

Two Fourier series neural networks (FSNNs) are used to realize a gate linkage controller in the embodiment of the present application, wherein the right FSNN is a simulator FSNN, which is a multi-input and single-output (MISO) FSNN and allows to simulate a dynamic behavior of the system.

An input vector $\lambda_e=[x_1, x_2, x_3, \ldots, x_m]$ of the simulator FSNN is defined as follows:

$$X_e = [u(k), u(k-1), \ldots, u(k-b_e), y(k-1), y(k-2), \ldots, y(k-a_e)]$$

wherein, $m_e=1+b_e+a_e$ is a number of inputs of the simulator FSNN, $b_e$ a number of u, and $a_e$ is a number of y.

An output of a simulator FSNN $\hat{y}$ is given by the following formula.

$$\hat{y} = W_0 + \sum_{n_1=1}^{N_1} \ldots \sum_{n_m=1}^{N_m} \sum_{j=1}^{l} W^j_{n_1,\ldots,n_{mc}} H_j$$

A connection weight of the simulator FSNN is adjusted by the following formula.

$$W^j_{n_1,\ldots,n_{mc}}(k) = W^j_{n_1,\ldots,n_{mc}}(k-1) + \eta e_h(k) H_j(k)$$

$$W_0(k) = W_0(k-1) + \eta e_h(k)$$

wherein, $n_1$ is a sequence length, $n_m$ is a sequence length, and $e_h(k)$ is an error of an $h^{th}$ output at the time step k.

The left FSNN is a multi-input and multi-output (MIMO) FSNN, which has three outputs ($o_1$, $o_2$ and $o_3$), and provides a gain for the controller, $K_p$, $K_i$, and $K_d$ are three parameters of the PID controller, and in the case of allowing $o_1=K_p$, $o_2=K_i$ and $o_3=K_d$, an input vector of the network is:

$$X_c = [e(k), e(k-1), \ldots, e(k-b_c), u(k-1), u(k-2), \ldots, u(k-a_c)]$$

wherein, $m_c=1+b_c+a_c$ is a number of input vectors, be is a number of e, and $a_c$ is a number of u.

An output of the FSNN is:

$$O_h = W^h_0 + \sum_{n_1=1}^{N_1} \ldots \sum_{n_{mc}=1}^{N_{mc}} \sum_{j=1}^{l} W^j_{n_1,\ldots,n_{mc}} H_j$$

$$H_1 = \cos(n_1\omega_1 x_1)\cos(n_2\omega_2 x_2) \ldots \cos(n_{mc-1}\omega_{mc-1}x_{mc-1})\cos(n_{mc}\omega_{mc}x_{mc})$$

$$H_2 = \cos(n_1\omega_1 x_1)\cos(n_2\omega_2 x_2) \ldots \cos(n_{mc-1}\omega_{mc-1}x_{mc-1})\sin(n_{mc}\omega_{mc}x_{mc})$$

$$\ldots$$

$$H_{l-1} = \sin(n_1\omega_1 x_1)\sin(n_2\omega_2 x_2) \ldots \sin(n_{mc-1}\omega_{mc}x_{mc-1})\cos(n_{mc}\omega_{mc}x_{mc})$$

$$H_l = \sin(n_1\omega_1 x_1)\sin(n_2\omega_2 x_2) \ldots \sin(n_{mc-1}\omega_{mc-1}x_{mc-1})\sin(n_{mc}\omega_{mc}x_{mc})$$

wherein $$W^{j,h}_{n_1,\ldots,n_{mc}} \text{ and } W^h_0$$

are respectively a connection weight and a deviation of an $h^{th}$ MISO FSNN $$\omega_i = \frac{2\pi}{T_i}, i = (1,2, \ldots, m)$$

Is a frequency weight, $T_l$ a range of an input $x_l$ ($x_i \in [0\ T_i]$), $l=2^m$ is a number of product nodes, $$W^j_{n_1,\ldots,n_{mc}}$$

is a connection weight value (a state weight value) between a hidden layer and an output layer, $W_0$ is a network bias, and $N_i$ is the sequence length. The weight $$W^j_{n_1,\ldots,n_{mc}}$$

is given by $$l \cdot \prod_{i=1}^{m} N_i.$$

The connection weight value of the FSNN which provides the gain for the PID controller is adjusted, so as to minimize the following objective function:

$$E(k) = \frac{1}{2}e(k)^2$$

$$e(k) = R(k) - y(k)$$

wherein, y(k) is a system output, that is, the gate opening degree, and R(k) is a reference value, that is, the target gate opening degree.

A self-adaptive rule is derived from an incremental rule as follows:

$$W_0^h(k) = W_0^h(k-1) - \eta \frac{\partial E(k)}{\partial W_0^k(k)}$$

$$W_{n_1,\ldots,n_{mc}}^{j,h}(k) = W_{n_1,\ldots,n_{mc}}^{j,h}(k-1) - \eta \frac{\partial E(k)}{\partial W_{n_1,\ldots,n_{mc}}^{j,h}(k)}$$

A calculation method for $$\frac{\partial E(k)}{\partial W_{n_1,\ldots,n_{mc}}^{j,h}(k)}$$

is as follows:

$$\frac{\partial E(k)}{\partial W_{n_1,\ldots,n_{mc}}^{j,h}(k)} = \frac{\partial E(k)}{\partial e(k)} \frac{\partial e(k)}{\partial y(k)} \frac{\partial y(k)}{\partial u(k)} \frac{\partial u(k)}{\partial O_h(k)} \frac{\partial O_h(k)}{\partial W_{n_1,\ldots,n_{mc}}^{j,h}(k)}$$

wherein, $$\frac{\partial u(k)}{\partial O_h(k)}$$

represents a Jacobian matrix at the time step k, which is estimated by an FSNN model.

In order to obtain a fast convergence and a good control performance of the control algorithm, the FSNN model must have sufficient accuracy, and a large estimation error may lead to the convergence or divergence of the control algorithm. An obtained Jacobian matrix system is as follows.

$$\frac{\partial y(k)}{\partial u(k)} \simeq \frac{\partial \hat{y}(k)}{\partial u(k)} = \sum_{n_1=1}^{N_1} \cdots \sum_{n_{mc}=1}^{N_{mc}} \sum_{j=1}^{l} W_{n_1,\ldots,n_{mc}}^{j}(k) \frac{\partial H_j(k)}{\partial u(k)}$$

Finally, the self-adaptive equation is as follows:

$$W_0^h(k) = W_0^h(k-1) + \eta e(k) \frac{\partial y(k)}{\partial u(k)} \frac{\partial u(k)}{\partial O_h(k)}$$

$$W_{n_1,\ldots,n_{mc}}^{j,h}(k) = W_{n_1,\ldots,n_{mc}}^{j,h}(k-1) + \eta e(k) \frac{\partial y(k)}{\partial u(k)} \frac{\partial u(k)}{\partial O_h(k)} H_j$$

Specifically, the controller obtains an initial gate opening degree (the current gate opening degree information) and a control parameter first during operation, and then the system outputs the difference value between the current gate opening degree and the expected opening degree (the target opening degree). An approximate value of the Jacobian matrix system is calculated first, then a new $$W_{n_1,\ldots,n_{mc}}^{j,h}$$

value is calculated, and finally a control law of the PID controller is calculated and determined, so as to control the canal gate.

An AFSNNPID controller is used to control the gate in the canal. On one hand, the control system can solve the problem that a traditional PID controller cannot process the multi-objective nonlinearity of the canal, realize automatic adjustment of the parameters, increase an adjustment speed of the gate, and regard the canal and the gate as an organic whole. On the other hand, the control system can realize the intelligent control of the gate, so as to reduce a labor cost, improve a safety factor of gate adjustment, provide more choices for the adjustment mode of the canal gate at the same time, and improve a risk response ability of the canal.

In the gate linkage control method provided by the embodiment of the present application, the current gate opening degree information of the parallel water supply and power generation system and the current water level of the third trunk canal are acquired, wherein the current gate opening degree information comprises the current first gate opening degree information and the current second gate opening degree information; the target gate linkage control strategy of the parallel water supply and power generation system is determined according to the current gate opening degree information of the parallel water supply and power generation system and the current water level of the third trunk canal; and the gate opening degree of the target gate is controlled according to the target gate linkage control strategy of the parallel water supply and power generation system. According to the method provided by the solution above, the target gate linkage control strategy of the parallel water supply and power generation system is determined according to the current gate opening degree information of the parallel water supply and power generation system and the current water level of the third trunk canal, so that gate control efficiency is improved while realizing accurate gate linkage control of a multi-gate water diversion project. Moreover, the canal water level is efficiently and automatically controlled through a simulation-control-feedback-adjustment sequence, so as to improve the risk response ability and regulation flexibility of the canal. This method may comprehensively perceive and efficiently regulate water amount states of various canals, such as a single canal, multiple canals and a water supply and power generation canal, so as to improve the risk response ability and the water supply stability of the canal, reduce the labor cost, and improve economic benefits.

An embodiment of the present application provides a gate linkage control device, applied to a parallel water supply and power generation system. The parallel water supply and power generation system comprises a reservoir, a first trunk canal, a second trunk canal, a stilling basin and a third trunk canal, the first trunk canal and the second trunk canal is connected in parallel, the reservoir is located in upstream positions of the first trunk canal and the second trunk canal, the stilling basin is located in downstream positions of the first trunk canal and the second trunk canal, a first gate is arranged between the first trunk canal and the reservoir, the second trunk canal is sequentially provided with a power generation tunnel and a generator set along a water flow direction, a second gate is arranged between the power generation tunnel and the generator set, and water flows in the first trunk canal and the second trunk canal flow into the third trunk canal through the stilling basin. The device is used for executing the gate linkage control method provided by the above embodiment.

Figure 4:
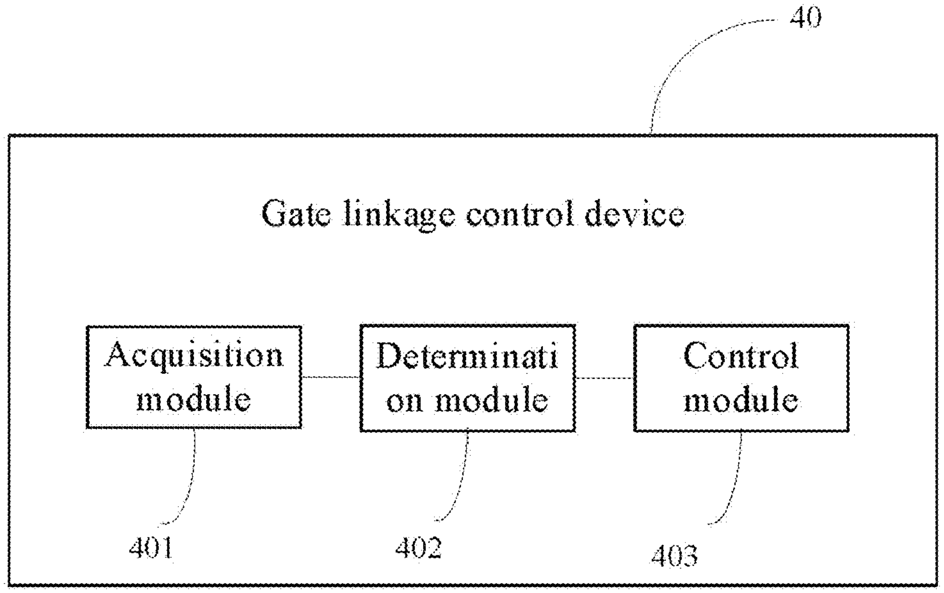
FIG. 4 is a schematic structural diagram of a gate linkage control device provided by the embodiment of the present application.

FIG. 4 is a schematic structural diagram of the gate linkage control device provided by the embodiment of the present application. The gate linkage control device 40 comprises an acquisition module 401, a determination module 402 and a control module 403.

The acquisition module is configured for acquiring current gate opening degree information of the parallel water supply and power generation system and a current water level of the third trunk canal, wherein the current gate opening degree information comprises current first gate opening degree information and current second gate opening degree information, the determination module is configured for determining a target gate linkage control strategy of the parallel water supply and power generation system according to the current gate opening degree information of the parallel water supply and power generation system and the current water level of the third trunk canal; and the control module is configured for controlling a gate opening degree of a target gate according to the target gate linkage control strategy of the parallel water supply and power generation system.

With regard to the gate linkage control device in this embodiment, specific executing ways of the modules have been described in detail in the embodiment of the method, which will not be described in detail herein.

The gate linkage control device provided by the embodiment of the present application is used for executing the gate linkage control method provided by the above embodiment, and has the same implementation mode and principle, which will not be repeated herein.

Figure 5:
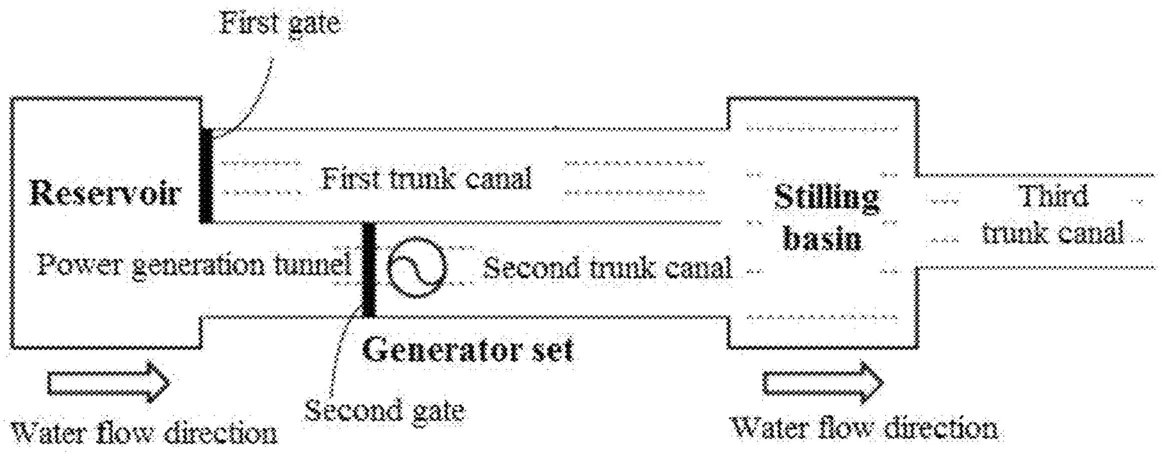
FIG. 5 is a schematic structural diagram of a parallel water supply and power generation system provided by the embodiment of the present application.

An embodiment of the present application provides a parallel water supply and power generation system, which is used for executing the gate linkage control method provided by the above embodiment. FIG. 5 is a schematic structural diagram of the parallel water supply and power generation system provided by the embodiment of the present application, and the system comprises:

a reservoir, a first trunk canal, a second trunk canal, a stilling basin and a third trunk canal, wherein the first trunk canal and the second trunk canal is connected in parallel, the reservoir is located in upstream positions of the first trunk canal and the second trunk canal, and the stilling basin is located in downstream positions of the first trunk canal and the second trunk canal, a first gate is arranged between the first trunk canal and the reservoir; the second trunk canal is sequentially provided with a power generation tunnel and a generator set along a water flow direction, and a second gate is arranged between the power generation tunnel and the generator set; and water flows in the first trunk canal and the second trunk canal flow into the third trunk canal through the stilling basin.

Specifically, the parallel water supply and power generation system provided by the embodiment of the present application is subjected to three levels of improvement. First of all, a project design is improved. The generator set is added into a simple water delivery canal, and in order to ensure the safety of the project, the previous single-canal water delivery is changed into multi-canal parallel water delivery, which improves a capacity and an adjustment space of a water delivery system, requires a lower water amount, has a wider application range than that of a simple power generation project, can be suitable for small and medium-sized rivers, and can take into account water and water energy in the utilization of water resources. The generated power is used to start a control device of the gate, and cooperates with power generated by light energy and wind energy at the same time to realize automatic operation throughout the day and the year. The gate needs to be controlled when there is water to generate power, and the gate does not need to be controlled when there is no water, so that the power generation by the generator set is not affected. Then, a multi-gate control method is used for parallel canals, and gates and monitoring devices are arranged at key nodes of the canals to ensure that professionals can see running states of the canals in real time. Meanwhile, a control system is used to collect water level and flow rate data of the canals to analyze and output gate opening degrees, and water amounts of the canals are adjusted by adjusting the gates. Moreover, the multi-gate setting can effectively improve the water distribution flexibility and the risk response ability of the canal, and the power generation system is combined with the control system, which realizes unattended and autonomous operation of the project.

In order to make full use of a head difference, the generator set is added in the water delivery process, which can bring some economic benefits while reducing potential energy of falling water. However, there are still some risks if only one canal is used to undertake tasks of power generation and water delivery. Because the generator set is affected by a power grid, a power generation load may fluctuate, and a corresponding power generation flow rate fluctuates accordingly. In addition, when the generator set fails or even stops, the power generation flow rate should be reduced to zero in a short time, while a water supply flow rate of the trunk canal needs to be relatively stable for a certain period of time. A large fluctuation of the flow rate in a short time will cause a sudden change of the water level of the trunk canal, which poses a threat to the safe operation of the canal. If an unexpected accident occurs to the generator set, after an outlet gate of the generator set is closed urgently, upstream incoming water has nowhere to pour, which is easy to cause risks. In addition, after water supply is stopped, a downstream water demand will be unable to be met, so as to have a chain effect.

Constructing another trunk canal on the basis of the original trunk canal can solve the problem that a water flow has nowhere to pour when the single canal is blocked, and can also ensure the downstream water supply demand at the same time. This canal has the same scale as the original trunk canal, and plays a backup adjustment role when the generator set is in normal operation. When the generator set fails, water delivery may be carried out through this canal, which can meet the downstream water demand while avoiding further damage to the generator set. In this way, the problem of downstream water delivery and the problem of guiding a discharge flow when the generator set fails can be solved. However, when the backup trunk canal is used for water delivery, the sudden increase of water flow will still damage a canal lining, so that the problem of sudden change of canal water level cannot effectively solved. In view of the control requirement of change of the canal water level, it is necessary to smoothly control an input flow, so as to ensure a slow change of the water level without affecting the operation of other water delivery facilities. Therefore, it is necessary to establish a reliable and efficient water supply and power generation linkage control system to coordinate a balance between power generation and a flow rate of water supply. A gate opening degree of an inlet gate of the trunk canal is adjusted in time by establishing the system, so as to ensure the safety of power generation of a power station and the safety of water delivery of the canal. An automation element is added on the basis of this system, which realizes the water supply and power generation linkage control and the automatic adjustment of the gate opening degree, can save some labor cost while improving a reaction speed and reduce the labor intensity of operation management staffs, and provides powerful technical means for scientific scheduling and daily operation.

Figure 6:
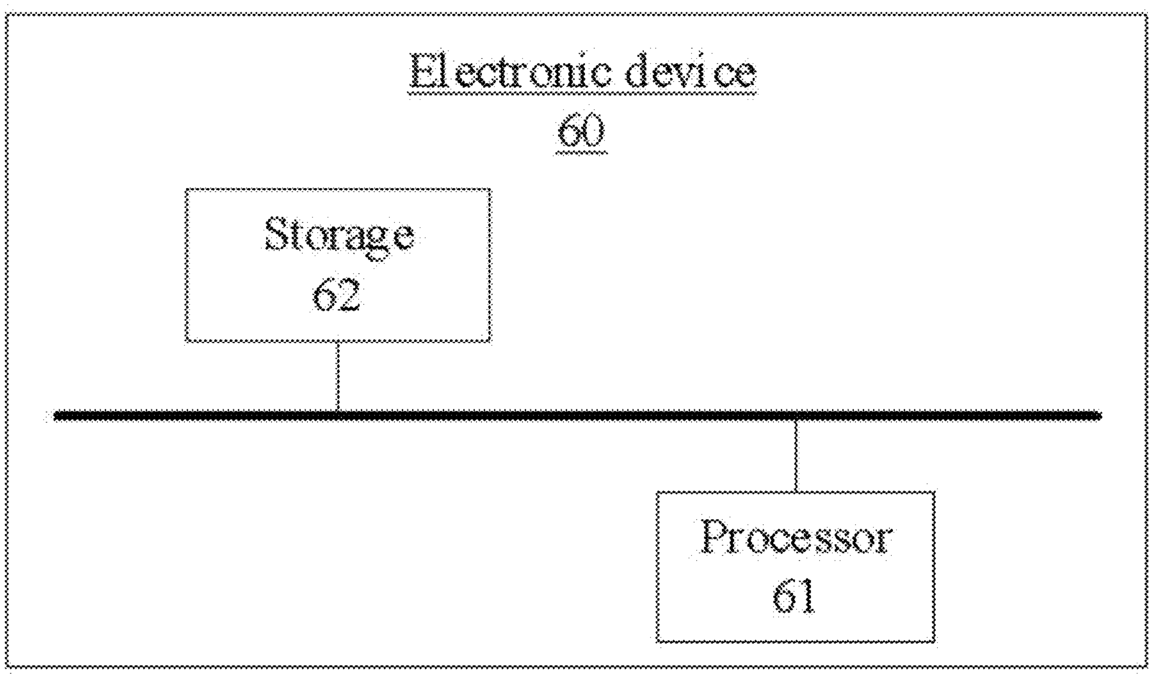
FIG. 6 is a schematic structural diagram of an electronic device provided by the embodiment of the present application.

The system further comprises an electronic device, and FIG. 6 is a schematic structural diagram of the electronic device provided by the embodiment of the present application. The electronic device 60 comprises at least one processor 61 and a storage 62.

The storage stores a computer executive instruction; and the at least one processor executes the computer executive instruction stored in the storage, so that the at least one processor executes the gate linkage control method provided by the above embodiment.

The parallel water supply and power generation system provided by the embodiment of the present application is used for executing the gate linkage control method provided by the above embodiment, and has the same implementation mode and principle, which will not be repeated herein.

In order to reflect the performance of the gate linkage control system in the present invention, gate control is designed in two different situations, wherein one refers to a response speed of gate control when there is no water in the canal, and the other refers to a response speed of gate control when there is water in the canal, which are compared with those of the ANNPDI (Artificial Neural Network PID). The parameters of the control system are preset first, as shown in Table 1.

TABLE 1

Presetting of parameters of control system

| | $T_1$ | $\omega_1$ | $N_1$ |
|---|---|---|---|
| Parameters of first presetting | 720 | 0.0087 | 5 |
| Parameters of second presetting | 720 | 0.0087 | 5 |

In the first experiment, each gate faces the same situation. For each controller, under the same initial condition, values of a mean square error (MSE), a mean absolute error (MAE) and a root mean square error (RMSE) are calculated in a considered control interval, and control results are shown in Table 2.

TABLE 2

Calculation time and values of MSE, MAE and RMSE of each controller

| | AFSNNPID | ANNPID |
|---|---|---|
| MSE | 174.39 | 181.65 |
| MAE | 8.51 | 9.85 |
| RMSE | 13.21 | 13.47 |
| Calculation time | 0.723 (ms) | 0.8023 (ms) |

In the second experiment, there is water in the canal, and the opening degree of each gate needs to be adjusted to a preset position. For each controller, under the same initial condition, control results are shown in Table 3.

TABLE 3

Calculation time and values of MSE, MAE and RMSE of each controller

| | AFSNNPID | ANNPID |
|---|---|---|
| MSE | 1095.84 | 1125.41 |
| MAE | 19.96 | 20.68 |
| RMSE | 33.12 | 33.54 |
| Calculation time | 0.727 (ms) | 0.794 (ms) |

It can be seen from the above that the gate linkage control method provided by the present invention has good control performances in tracking accuracy and robustness to external interference and dynamic system change, and can effectively deal with nonlinear problems such as gate linkage control. In addition, the calculation time of the control system is very short, thus having a great application prospect in real-time control.

An embodiment of the present application provides a computer-readable storage medium, wherein the computer-readable storage medium stores a computer executive instruction, and when executed by a processor, the computer executive instruction implements the gate linkage control method provided in any embodiment above.

The computer-readable storage medium comprising the computer executive instruction according to the embodiment of the present application may be used for storing the computer executive instruction for the gate linkage control method provided by the above embodiment, and has the same implementation mode and principle, which will not be repeated herein.

In the several embodiments provided in the present application, it should be understood that the disclosed device and method may be implemented in other ways. For example, the foregoing device embodiments are only illustrative. For example, the division of the units is only one logical function division. In practice, there may be other division methods. For example, multiple units or assemblies may be combined or integrated into another system, or some features may be ignored or not executed. In addition, the illustrated or discussed mutual coupling or direct coupling or communication connection may be indirect coupling or communication connection through some interfaces, devices or units, and may be in electrical, mechanical or other forms.

The units illustrated as separated parts may be or not be physically separated, and the parts displayed as units may be or not be physical units, which means that the parts may be located in one place or distributed on multiple network units. Some or all of the units may be selected according to actual needs to realize the objects of the solutions of the embodiments.

In addition, each functional unit in each embodiment of the present application may be integrated in one processing unit, or each unit may exist alone physically, or two or more units may be integrated in one unit. The integrated units above may be implemented in a form of hardware, or may be implemented in forms of hardware and software functional units.

The integrated units above realized in the form of software functional unit may be stored in a computer-readable storage medium. The software functional unit is stored in one storage medium including a number of instructions such that a computer device (which may be a personal computer, a server, a network device, or the like) or a processor executes a part of steps of the method in the embodiments of the present application. The foregoing storage medium comprises any medium capable of storing program codes such as a USB disk, a mobile hard disk, a Read-Only Memory (ROM), a Random Access Memory (RAM), a magnetic disk, an optical disk, or the like.

It can be clearly understood by those skilled in the art that for the convenience and conciseness of description, only the division of the above functional modules is exemplified. In practical application, the above function allocation may be completed by different functional modules as required, that is, an internal structure of the device is divided into different functional modules to complete all or part of the above-described functions. The specific working process of the device described above may refer to the corresponding processes in the aforementioned method embodiments, which will not be repeated herein.

Finally, it should be noted that, the embodiments above are only used to illustrate the technical solution of the present application, and are not intended to limit the present application Although the present application has been described in detail with reference to the above-mentioned embodiments, those of ordinary skills in the art should understand that: the technical solution recorded in the above-mentioned embodiments can still be modified, or equivalent substitutions can be made to a part or all of the technical features in the embodiments. However, these modifications or substitutions should not depart from the scope of the technical solution of the embodiments of the present application.

What is claimed is:

1. A gate linkage control method, applied to a parallel water supply and power generation system, the parallel water supply and power generation system comprising a reservoir, a first trunk canal, a second trunk canal, a stilling basin and a third trunk canal, the first trunk canal and the second trunk canal being connected in parallel, the reservoir being located in upstream positions of the first trunk canal and the second trunk canal, the stilling basin being located in downstream positions of the first trunk canal and the second trunk canal, a first gate being arranged between the first trunk canal and the reservoir, the second trunk canal being sequentially provided with a power generation tunnel and a generator set along a water flow direction, a second gate being arranged between the power generation tunnel and the generator set, and water flows in the first trunk canal and the second trunk canal flowing into the third trunk canal through the stilling basin, wherein the method comprises the following steps of:

acquiring current gate opening degree information of the parallel water supply and power generation system and a current water level of the third trunk canal, wherein the current gate opening degree information comprises current first gate opening degree information and current second gate opening degree information;

determining a target gate linkage control strategy of the parallel water supply and power generation system according to the current gate opening degree information of the parallel water supply and power generation system and the current water level of the third trunk canal;

controlling a gate opening degree of a target gate according to the target gate linkage control strategy of the parallel water supply and power generation system.

2. The method according to claim 1, wherein the determining the target gate linkage control strategy of the parallel water supply and power generation system according to the current gate opening degree information of the parallel water supply and power generation system and the current water level of the third trunk canal, comprises:

acquiring a target water level of the third trunk canal;

determining a gate linkage control strategy set of the parallel water supply and power generation system according to a difference value between the current water level and the target water level and the current gate opening degree information based on a preset hydrodynamic model;

screening a target gate linkage control strategy with the minimum water level error from the gate linkage control strategy set based on a preset optimized objective function of a water level error.

3. The method according to claim 2, wherein the screening the target gate linkage control strategy with the minimum water level error from the gate linkage control strategy set based on the preset optimized objective function of the water level error, comprises:

screening the target gate linkage control strategy with the minimum water level error from the gate linkage control strategy set based on the following preset optimized objective function of the water level error:

$$U^* = \underset{U}{\operatorname{argmin}} J(U, x_0)$$

$$J(U, x_0) = \sum_{k=0}^{N_h-1} \left(x^T(k)Qx(k) + Q_l x(k) + u^T(k)Ru(k)\right) + x^T(N_h)Qx(N_h)$$

wherein, U* represents the target gate linkage control strategy, U represents any gate linkage control strategy in the gate linkage control strategy set, $x_0$ represents an initial water level of the third trunk canal corresponding to the gate linkage control strategy U, J(U, $x_0$) is a water level error calculation function, k is a time step, $N_h$ is a prediction interval, and the prediction interval comprises a plurality of time steps, x(k) is a predicted water level value of the third trunk canal under the time step k, Q and R are preset constant weighting matrices of a quadratic deviation penalty, $Q_l$ is a preset constant weighting matrix of a linear penalty, T is a transposition symbol, u(k) is a gate opening degree of each gate represented by the gate linkage control strategy U, and x ($N_h$) is a final error between the predicted water level value and a target water level value in the prediction interval.

4. The method according to claim 3, wherein the third trunk canal is composed of a plurality of sub-trunk canals connected in series, the stilling basin is arranged between the sub-trunk canals, the third trunk canal is provided with a plurality of outlet gates, and the target gate comprises the outlet gate, and the method further comprises the following steps of:

predicting a differential error of each stilling basin in the case that the gate opening degree of the target gate is controlled according to the target gate linkage control strategy based on a preset calculation formula of the differential error, and optimizing the target gate linkage control strategy when the differential error of any stilling basin is not less than a preset threshold of the differential error.

5. The method according to claim 4, wherein the predicting the differential error of each stilling basin in the case that the gate opening degree of the target gate is controlled according to the target gate linkage control strategy based on the preset calculation formula of the differential error, comprises:

predicting the differential error of each stilling basin in the case that the gate opening degree of the target gate is controlled according to the target gate linkage control strategy based on the following preset calculation formula of the differential error:

$$D_j = e_j - \frac{1}{n-1}\left(\sum_{i=1}^{n-1} e_i\right)$$

wherein, $D_j$ is a differential error of a stilling basin j, $e_j$ is a water level error of the stilling basin j, n a total number of stilling basins, and $e_i$ is a water level error of other stilling basins except the stilling basin j.

6. The method according to claim 1, wherein the controlling the gate opening degree of the target gate according to the target gate linkage control strategy of the parallel water supply and power generation system, comprises:

controlling the gate opening degree of the target gate according to the target gate linkage control strategy of the parallel water supply and power generation system based on a preset PID controller.

7. The method according to claim 6, further comprising the following step of:

optimizing a gain parameter of the preset PID controller based on the following formula according to a preset period:

$$O_h = W_0^h + \sum_{n_1=1}^{N_1} \cdots \sum_{n_{mc}=1}^{N_{mc}} \sum_{j=1}^{l} W_{n_1,\ldots,n_{mc}}^{j} H_j$$

wherein, $O_h$ is the gain parameter, $$W_0^h$$

is a neural network bias after self-adaptive adjustment, $N_1$ is a neuron sequence length of a $1^{st}$ hidden layer of a neural network, $N_{mc}$ is a neuron sequence length of an $mc^{th}$ hidden layer of the neural network, mc represents a total number of hidden layers of the neural network, l=3, $$W_{n_1,\ldots,n_{mc}}^{j}$$

is a neural network connection weight after self-adaptive adjustment, and $H_j$ is an intermediate variable.

8. The method according to claim 1, wherein, after controlling the gate opening degree of the target gate according to the target gate linkage control strategy of the parallel water supply and power generation system, the method further comprises the following steps of:

monitoring a current actual opening degree of each target gate;

determining a target gate opening degree correction strategy according to a deviation between the current actual opening degree of each target gate and the target opening degree of each target gate represented by the target gate linkage control strategy.

9. A gate linkage control device, applied to a parallel water supply and power generation system, the parallel water supply and power generation system comprising a reservoir, a first trunk canal, a second trunk canal, a stilling basin and a third trunk canal, the first trunk canal and the second trunk canal being connected in parallel, the reservoir being located in upstream positions of the first trunk canal and the second trunk canal, the stilling basin being located in downstream positions of the first trunk canal and the second trunk canal, a first gate being arranged between the first trunk canal and the reservoir, the second trunk canal being sequentially provided with a power generation tunnel and a generator set along a water flow direction, a second gate being arranged between the power generation tunnel and the generator set, and water flows in the first trunk canal and the second trunk canal flowing into the third trunk canal through the stilling basin, wherein the device comprises:

an acquisition module configured for acquiring current gate opening degree information of the parallel water supply and power generation system and a current water level of the third trunk canal, wherein the current gate opening degree information comprises current first gate opening degree information and current second gate opening degree information;

a determination module configured for determining a target gate linkage control strategy of the parallel water supply and power generation system according to the current gate opening degree information of the parallel water supply and power generation system and the current water level of the third trunk canal;

a control module configured for controlling a gate opening degree of a target gate according to the target gate linkage control strategy of the parallel water supply and power generation system.

* * * * *